US009282778B1

(12) United States Patent
Ingram

(10) Patent No.: US 9,282,778 B1

(45) Date of Patent: Mar. 15, 2016

(54) INFANT HAT WITH PACIFIER RETAINING STRAP

(76) Inventor: Jessica E. K. Ingram, Stafford, VA (US)

( * ) Notice: Subject to any disclaimer, the term of this patent is extended or adjusted under 35 U.S.C. 154(b) by 466 days.

(21) Appl. No.: 13/561,437

(22) Filed: Jul. 30, 2012

(51) Int. Cl.

| | |
|---|---|
| ***A42B 1/24*** | (2006.01) |
| ***A61J 17/00*** | (2006.01) |
| ***A45F 5/00*** | (2006.01) |
| ***F16B 2/22*** | (2006.01) |
| ***A45F 5/02*** | (2006.01) |

(52) U.S. Cl.

CPC ... *A42B 1/24* (2013.01); *A45F 5/02* (2013.01); *A61J 17/00* (2013.01); *F16B 2/22* (2013.01); *Y10T 24/13* (2015.01)

(58) Field of Classification Search

CPC .............. A42B 1/24; F16B 2/22; A61J 17/00; A45F 5/02; Y10T 24/13

USPC ............... 2/13, 209.13; 606/234; 24/301, 3.1, 24/3.12, 3.13; 215/11.1, 11.4

See application file for complete search history.

(56) References Cited

U.S. PATENT DOCUMENTS

| | | | | |
|---|---|---|---|---|
| 2,834,350 | A | 5/1958 | Beck, Jr. et al. | |
| 3,392,729 | A | 7/1968 | Lenoir | |
| 4,641,647 | A | 2/1987 | Behan | |
| 4,697,589 | A | 10/1987 | King et al. | |
| 4,765,037 | A | 8/1988 | Perry | |
| 4,969,894 | A | 11/1990 | Hempstead-Harris | |
| 4,990,157 | A | 2/1991 | Roberts | |
| 5,517,986 | A * | 5/1996 | Starr et al. | 128/206.24 |
| 6,068,649 | A | 5/2000 | Chamberlain | |
| 6,312,449 | B1 | 11/2001 | Chang et al. | |
| 7,086,121 | B2 | 8/2006 | Lippincott | |
| 2006/0265013 | A1* | 11/2006 | Holley, Jr. | 606/234 |
| 2006/0271106 | A1* | 11/2006 | Su | 606/234 |
| 2009/0013449 | A1 | 1/2009 | Kahn | |
| 2011/0057084 | A1* | 3/2011 | Thompson | 248/314 |

* cited by examiner

*Primary Examiner* — Khoa Huynh

*Assistant Examiner* — Katharine Gracz

(74) *Attorney, Agent, or Firm* — Robert C. Montgomery; Montgomery Patent Design, LLC

(57) ABSTRACT

An infant hat with a pacifier retaining strap retains and secures a pacifier nearby an infant's mouth. The device includes a hat and a pair of fastening straps. The hat is a headgear member adapted for wear on a head of an infant. Each of the straps is a durable fabric member affixed to a perimeter side portion of the hat. Each strap has a fastener which allows the free end of strap to be secured to a middle portion of itself to form a loop. In such a manner, both straps loop through a pair of pacifier mouth guard slits while an infant is wearing the hat in order to provide secure retention of the pacifier within or adjacent to the infant's mouth. In an alternate embodiment, the pair of fastening straps attach to a separate retaining ring capable of engaging a rear of the pacifier guard.

13 Claims, 9 Drawing Sheets

INFANT HAT WITH PACIFIER RETAINING STRAP

RELATED APPLICATIONS

Not Applicable.

FIELD OF THE INVENTION

The present invention relates generally to infant pacifiers, and in particular, to a hat having a pair of pacifier retaining straps and a retaining ring for maintaining a pacifier in a position adjacent to the mouth of an infant.

BACKGROUND OF THE INVENTION

As any parent will surely attest, pacifiers are indispensable pieces of equipment used in the raising of a child. They are invaluable in that they satisfy a child's need to be soothed and comforted. Of course, a pacifier is prone to easily falling out of an infant's mouth and can be even thrown or dropped, whether intentional or accidental. Then the parent or care giver must quickly locate the pacifier and perhaps even clean it should it be dirty. This quickly becomes tiresome for the adults and irritating for the child resulting in crying on their part. This is especially troublesome during nighttime hours when the parent must get up out of bed over and over again.

Existing pacifier retaining devices typically include an elongated strap or cord having one (1) end connected or affixed to the pacifier and the other opposing end coupled to the infant or the infant's clothing. These retaining devices are often times unreliable and can in some instances be dangerous for the infant.

SUMMARY OF THE INVENTION

The inventor has recognized the aforementioned inherent problems and lack in the art and observed that there is a need for a wearable device that retains pacifiers such that they do not fall away from a child's mouth.

Accordingly, it is an object of the present embodiments of the invention to solve at least one of these problems. The inventor has addressed this need by developing an infant hat with pacifier retaining strap that allows parents and caregivers the ability to retain a pacifier in a child's mouth which is easy and effective and also reduces loss of pacifiers. The inventor has thus realized the advantages and benefits of providing a infant hat with pacifier retaining strap includes a hat having a flexible head receiving member adapted to receive an infant's head having a perimeter opening suitably sized to approximate the infant's head and a pair of straps affixed to opposing locations upon the hat perimeter opening. Each of the straps having a length adjustable fastener for forming a loop in a free end. The loop in the free end of each strap is connectable to side slits on opposing ends of a pacifier guard for maintaining a pacifier in a position adjacent to a mouth of an infant.

In certain embodiments, the device also includes a retaining ring adapted to contact a rear surface of a pacifier guard. The loop in the free end of each strap is connectable to the retaining ring for maintaining a pacifier in a position adjacent to a mouth of an infant.

The loop is formed when the male snap fastener is engaged to a selected one of the plurality of female snap fasteners. Engaging the male snap fastener to a different one of the plurality of female snap fasteners longitudinally adjusts a length of the strap to effectively maintain the pacifier at different positions relative to the infant's mouth.

Another feature of the invention is providing a pacifier retaining ring that is attachable to the infant hat having a pair of straps affixed to opposing locations upon a hat perimeter opening, where each of the straps include a length adjustable fastener for forming a loop in a free end and the retaining ring includes a generally thin retaining ring body having a curved shape adapted to match a shape of a pacifier mouth guard. A pair of retaining ring slots is disposed along opposing sides of the retaining ring body adapted for receiving the pair of straps. A retaining feature is disposed on the retaining ring body and is adapted for receiving a pacifier handle affixed to the rear surface of the pacifier mouth guard. The straps are connected through the retaining ring slots for maintaining the pacifier in a position adjacent to the mouth of the infant.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY

Figure 1:
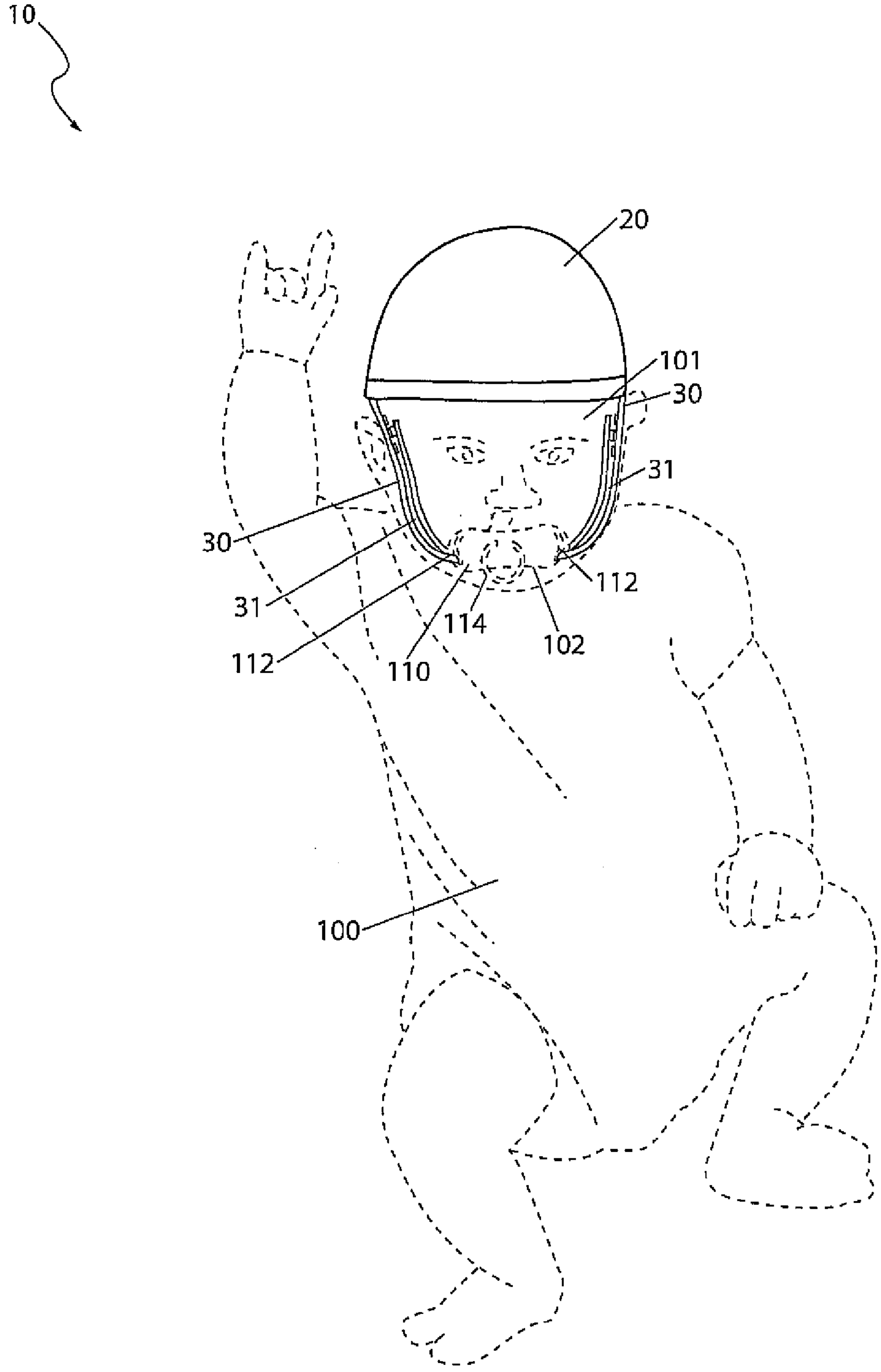
FIG. 1 is an environmental view of the infant hat with pacifier retaining strap in accordance with the invention, depicted as attached to a first pacifier.

10 infant hat with pacifier retaining strap
20 hat
30 pacifier retaining strap
31 strap loop
34 female fastener
35 male fastener
40 pacifier retaining ring
41 retaining ring aperture
100 infant
101 head 102 mouth
110 first pacifier
111 mouth guard
112 first pacifier slit
113 nipple
114 first pacifier handle
120 second pacifier
124 second pacifier handle
125 third pacifier
126 third pacifier handle
127 fourth pacifier
128 fourth pacifier handle
129 nipple aperture
140 first alternate retaining ring
141 first alternate retaining ring body
142 first alternate retaining ring slot
143 first alternate retaining feature
144 perimeter member
145 flaps
146 retaining aperture
240 second alternate retaining ring
241 second alternate retaining ring body
242 second alternate retaining ring slot
243 second alternate retaining feature
244 nipple grip
245 nipple grip aperture
246 handle slot
247 L-shaped protrusion

DETAILED DESCRIPTION OF THE PREFERRED EMBODIMENT

Figure 2:
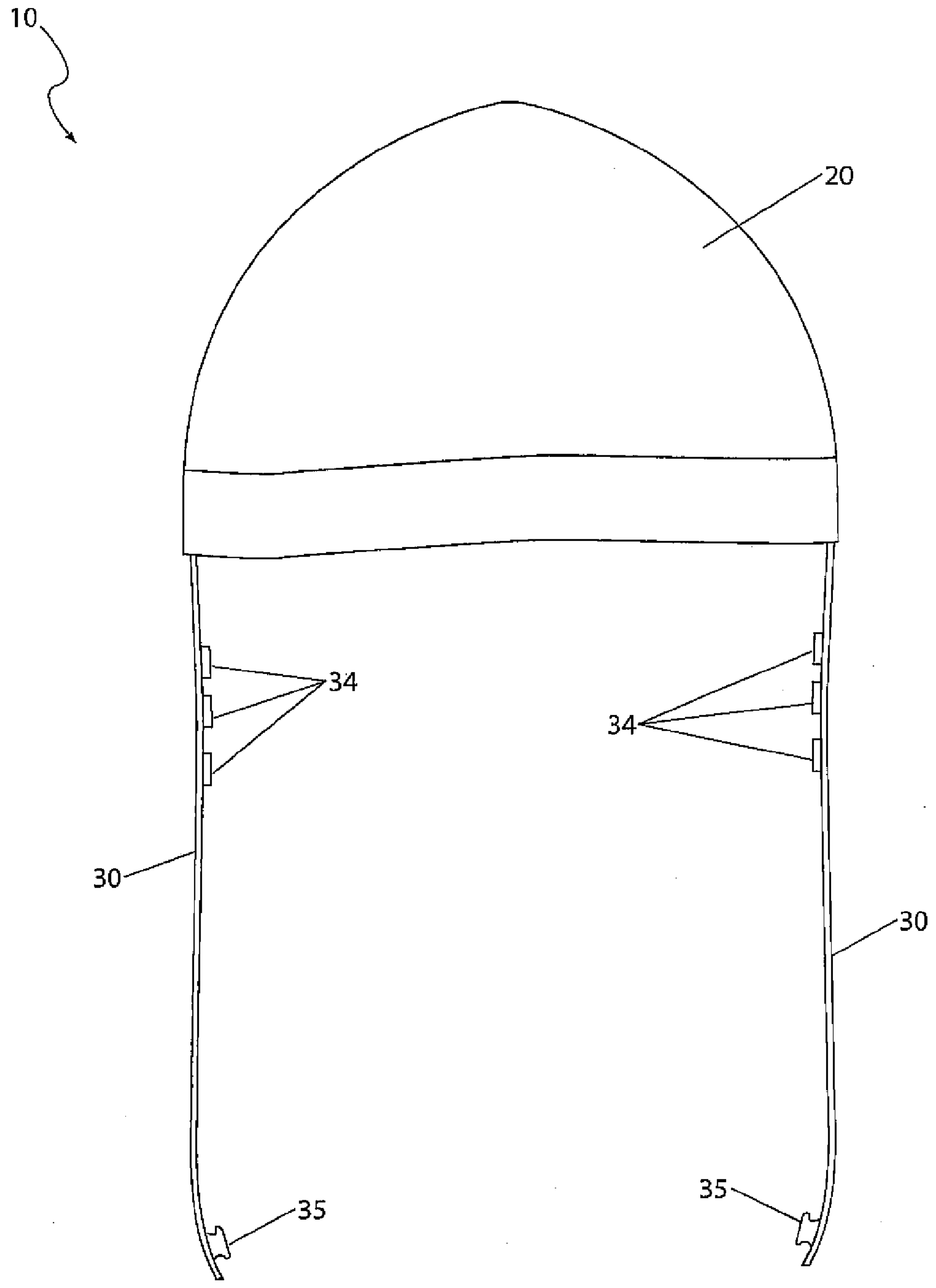
FIG. 2 is a front perspective view of the infant hat with pacifier retaining strap.
Figure 3:
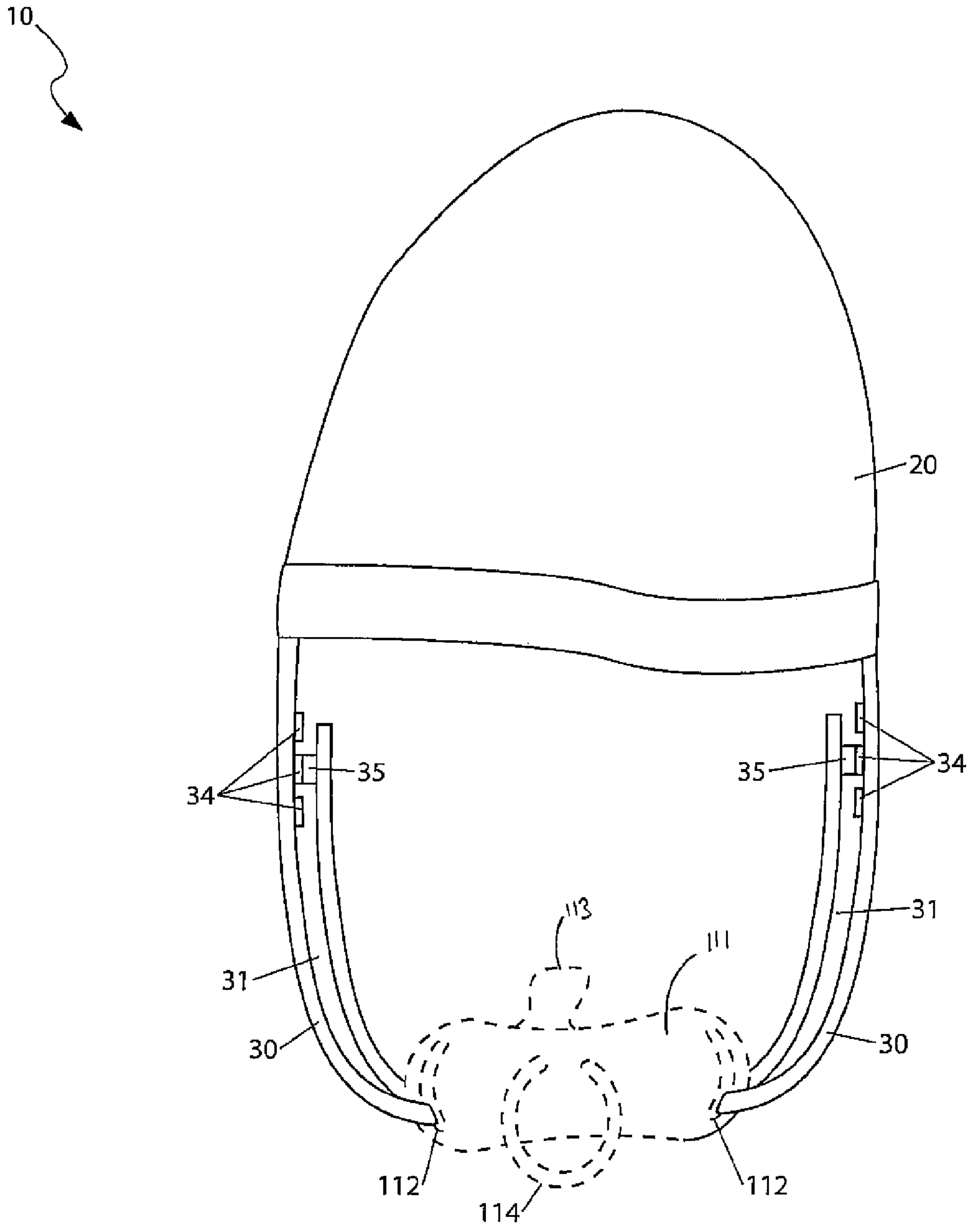
FIG. 3 is a front perspective view of the infant hat with pacifier retaining strap depicted as attached to the first pacifier.

In accordance with the invention, the best mode is presented in terms of a preferred embodiment, herein depicted within FIGS. 1 through 3, and in alternate embodiments herein depicted within FIGS. 4 through 10. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 10, depicting an infant hat with pacifier retaining strap (herein described as a "device") 10, where like reference numerals represent similar or like parts. In accordance with the invention, the present disclosure describes the device 10 for keeping various styles of pacifiers 110, 120, 125, 127 retained within an infant's mouth 102 or nearby to the infant's mouth 102 during periods when the pacifier 110, 120, 125, 127 falls out of the child's mouth 102.

The device 10 generally includes a hat 20 and a pair of pacifier retaining straps 30 to hold the pacifier 110, 120, 125, 127 against an infant 100 with an adjustable amount of tension. The device 10 is particularly suited for use while an infant 100 is sleeping, wherein the device 10 applies just enough force to prevent the pacifier 110, 120, 125, 127 from slipping out of the infant's mouth 102 and waking the infant 100.

FIG. 1 shows an environmental view of the device 10 depicted as attached to a first pacifier 110 which is disposed within an infant's mouth 102. The hat 20 is placed on the top of an infant's head 101 during use. In certain embodiments, the hat 20 is constructed of a soft, elastic fabric material that fits securely and comfortably over the infant's head 101.

FIG. 2 shows a front perspective view of the device 10. The pacifier retaining straps 30 are generally rectangular fabric straps having a relatively narrow width compared to length. Both of the straps 30 are affixed to the hat 20 at a near end. The straps 30 are affixed at opposing points along a lower perimeter edge of the hat 20. The straps 30 are preferably sewn to the hat 20 during manufacturing.

Each strap 30 has a male fastener 35 affixed to a flat surface at a distal inner end, opposite the near end affixed to the hat 20. The male fastener 35 is a releasable mechanical fastener, such as a snap fastener, a button fastener, a hook-and-loop fastener or the like. Each strap 30 also has a plurality of corresponding female fasteners 34 affixed to the same flat inner surface as the male fastener 34 at a proximal end of the strap 30. The plurality of female fasteners 34 are preferably equally spaced along the length of the near end of the strap 30. The female fastener 34 is a corresponding portion of the releasable mechanical fastener, such as a snap fastener, a button fastener, a hook-and-loop fastener or the like.

The male fastener 35 is releasably fastenable to any one (1) of the female fasteners 34 during use to form a closed loop 31 in the strap 30. The size of the loop 31 is adjusted by fastening the male fastener 35 to a desired one (1) of the female fasteners 34. In the illustrated embodiments, the male fastener 35 is a male snap fastener and the female fasteners 34 are female snap fasteners which receive and retain the male fastener 35 via an interference and friction fit. It can be appreciated that other releasable two-part mechanical fasteners such as hook-and-loop-type fasteners, belt-type fasteners, and the like can be used with equal benefit as aforementioned.

FIG. 3 shows a front perspective view of the device 10 as attached to the first pacifier 110. The first pacifier 110 is illustrated as one variety of infant pacifiers having a mouth guard 111, a nipple 113 extending from an inner surface of the mouth guard 111, and a first pacifier handle 114 attached to an outer surface of the mouth guard 111. The first pacifier handle 114 is illustrated as a ring hingedly attached to the mouth guard 111. The first pacifier 110 also includes a pair of first pacifier slits 112 located at opposing side positions, in a manner common to many styles of pacifiers.

When utilized with the first pacifier 110, having the pair of opposing slits 112, the straps 30 are threaded through the respective slits 112 in order to retain the pacifier 110 to the infant's mouth 102. More particularly, during use a caretaker places the hat 20 on the infant's head 101 and then threads the distal end of each strap 30 through the respective slit 112. The caretaker then fastens each male fastener 35 to a desired one (1) of the corresponding female fasteners 34 to form a loop 31, thereby preventing the pacifier 110 from falling away from the infant's mouth 102. The size of the loops 31 vary based on which female fastener 34 is utilized, in such a manner the caretaker can provide a selected amount of tension against the pacifier 110 with the straps 30 and select a configuration which securely retains the pacifier 110 without straining or injuring the infant 100.

Figure 4:
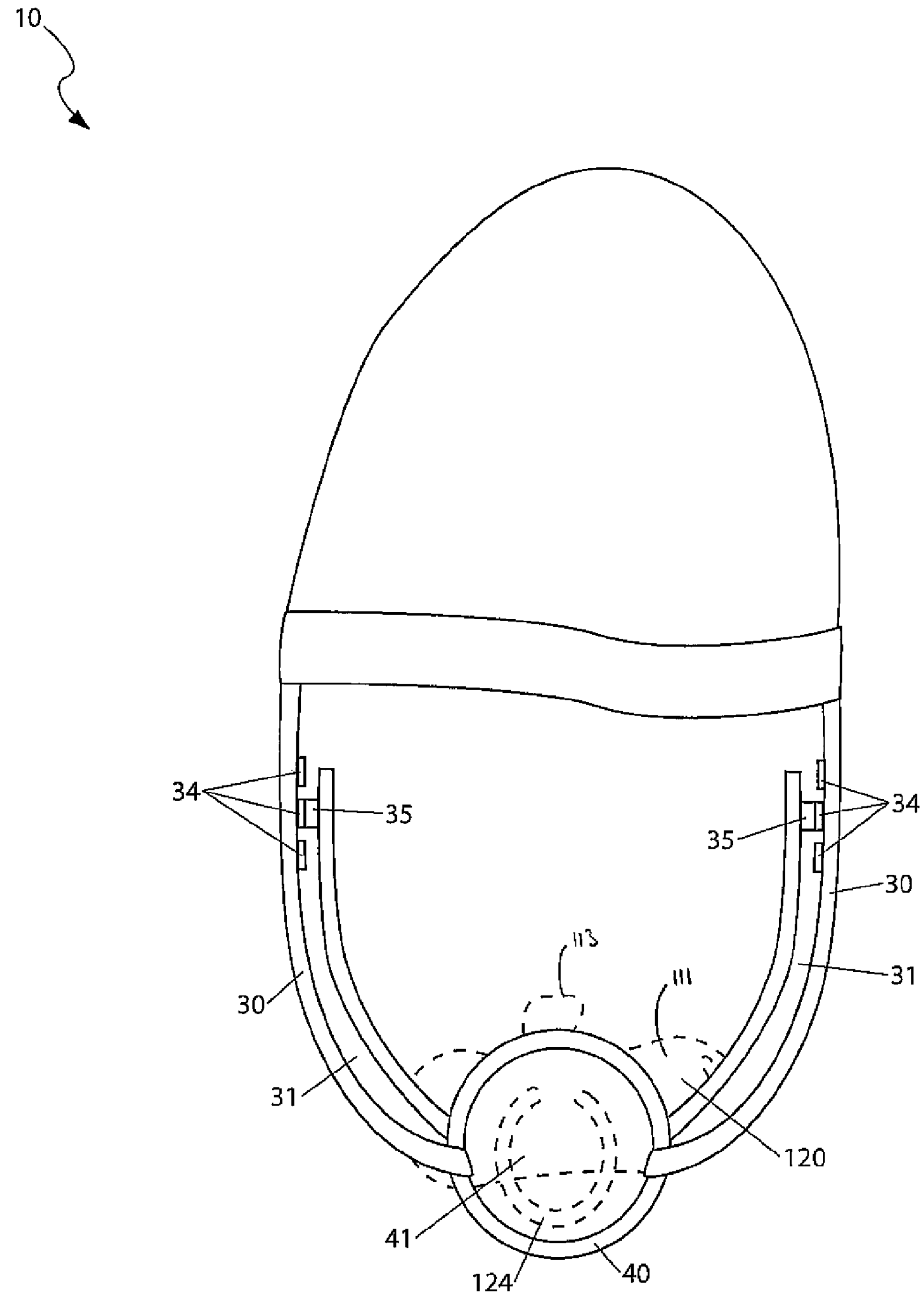
FIG. 4 is a front perspective view of the infant hat with pacifier retaining strap in accordance with the invention depicted as attached to a pacifier retaining ring for use with a second pacifier.

FIG. 4 shows a front perspective view of an alternate embodiment of the device 10 utilizing a retaining ring 40 which is coupleable to a second pacifier 120 in accordance with the invention. In certain embodiments, the device 10 includes a retaining ring 40 that is used to retain various styles of second pacifiers 120 which do not have slits 112. The retaining ring 40 is a thin circular structure with an open space in the middle forming a large aperture 41. The retaining ring

40 has a size similar to the overall size of the pacifier 120. In certain embodiments, the retaining ring 40 has a generally torus shape and is constructed from a high-friction plastic material to prevent slipping against the outer surface of the mouth guard 111 of the second pacifier 120.

The retaining ring aperture 41 is large enough to be placed against the outer surface of the mouth guard 111 of the second pacifier 120 and to fit over a second pacifier handle 124 attached to the mouth guard 111. The retaining ring aperture 41 is small enough that the retaining ring 40 contacts the mouth guard 111 of the second pacifier 120 when the aperture 41 is placed over the second pacifier handle 124. The straps 30 are attached to the retaining ring 40 by forming strap loops 31 around the retaining ring 40 in a similar manner as forming the loops 31 through the pacifier slits 112 as previously described for use with the first pacifier 110. When the retaining ring 40 is mounted to the second pacifier 120, it applies a force against the outer, or rear, surface of the mouth guard 111 of the second pacifier 120 to retain in the infant's mouth 102.

Figure 5:
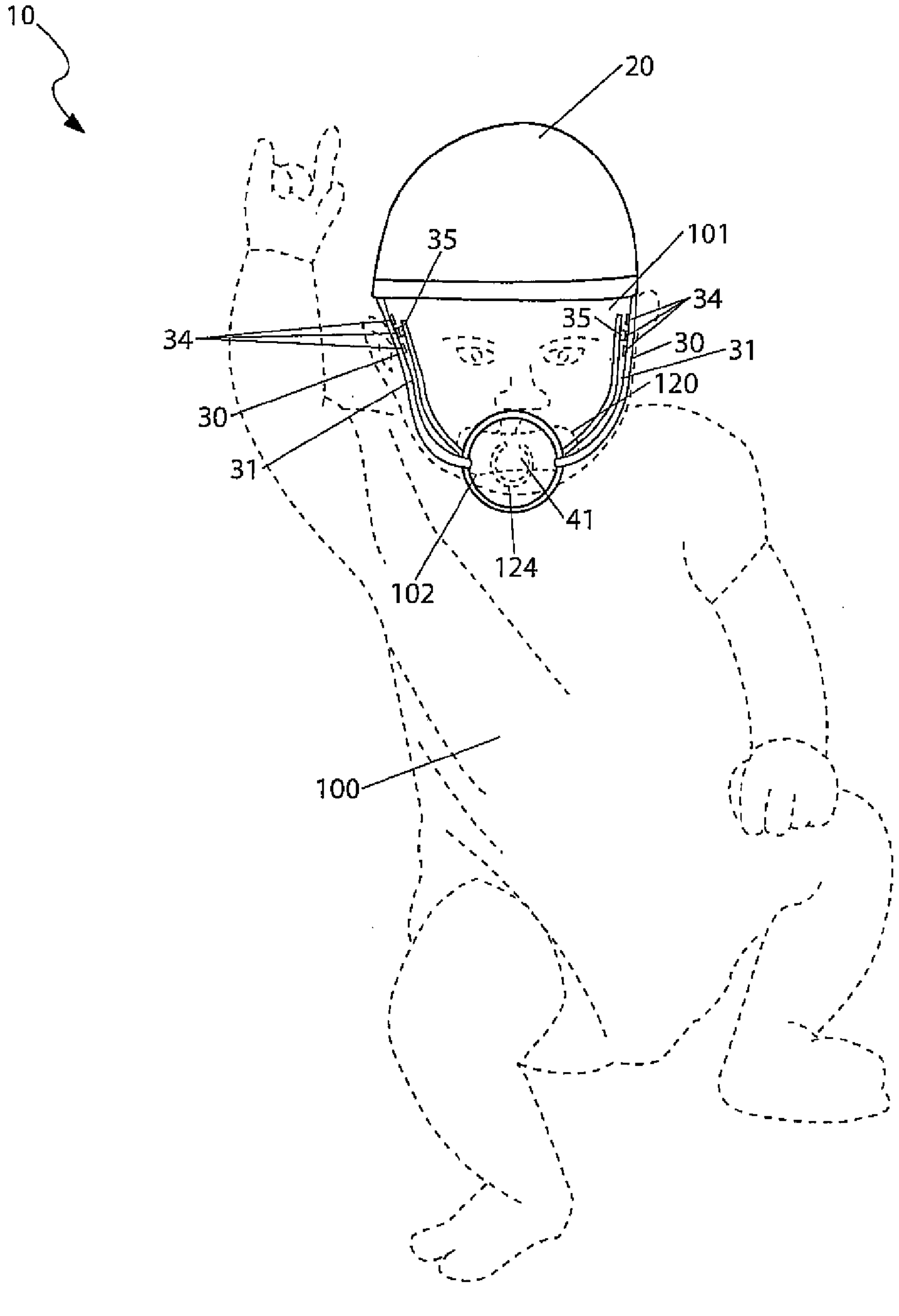
FIG. 5 is an environmental view of the infant hat with pacifier retaining strap and the retaining ring depicted as attached to the second pacifier.

FIG. 5 shows an environmental view of the device 10 and the retaining ring 40 as attached to the second pacifier 120 which is depicted in the infant's mouth 102. During use with the second pacifier 120, having no pacifier slits 112, the hat 20 is placed on the infant's head 101 and the second pacifier 120 is placed in the infant's mouth 102. The retaining ring 40 is passed over the second pacifier handle 124 and placed against the mouth guard 111 of the second pacifier 120. The straps 30 are then passed through the ring 40 and the male fastener 35 is attached to a selected one (1) of the corresponding female fasteners 34 to form a pair of loops 31. This provides a gentle force against the rear of the pacifier 120 to prevent the retaining ring 40 from falling away. Since the retaining ring 40 is positioned over the second pacifier 120, the retaining ring 40 holds the second pacifier 120 against the infant's mouth 102 and prevents the pacifier 120 from accidentally falling away from the infant 100 while sleeping. Alternately, the pacifier can be attached to the straps 30 prior to placing the hat 20 on the head 110 of the infant 100.

The device 10 is adjusted against the second pacifier 120 similarly to the first pacifier 110. The size of the loops 31 will vary based on which female fastener 34 is utilized, so that the caretaker can provide a selected amount of tension against the retaining ring 40 and thus the pacifier 110.

Figure 6:
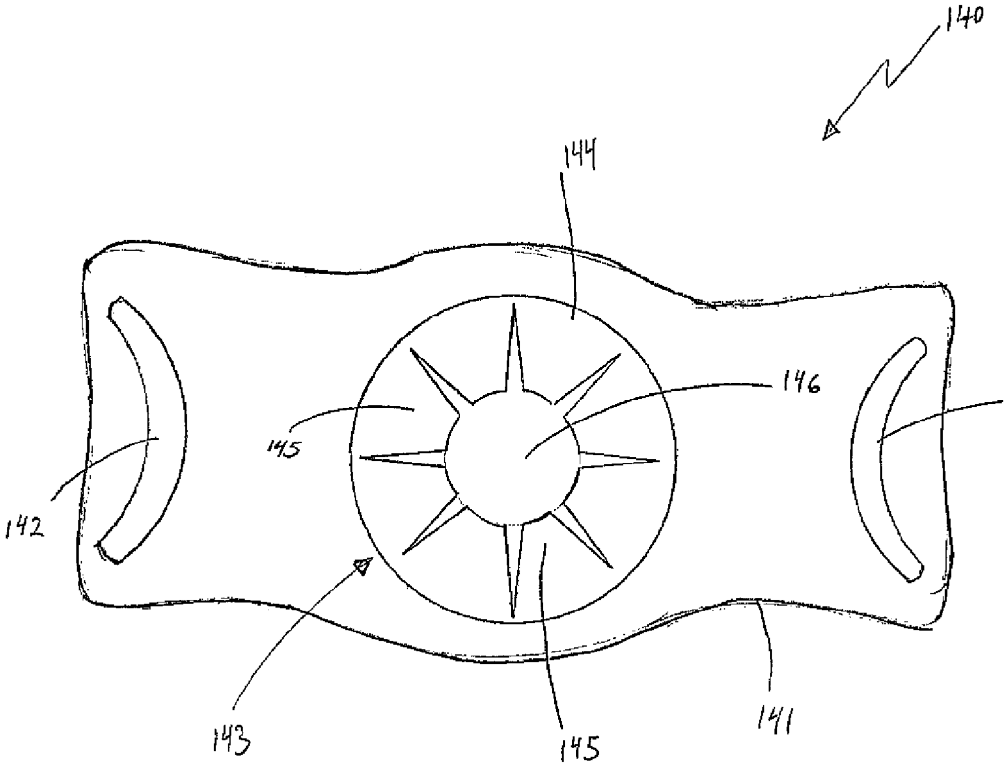
FIG. 6 is a front view of a first alternate retaining ring.
Figure 7:
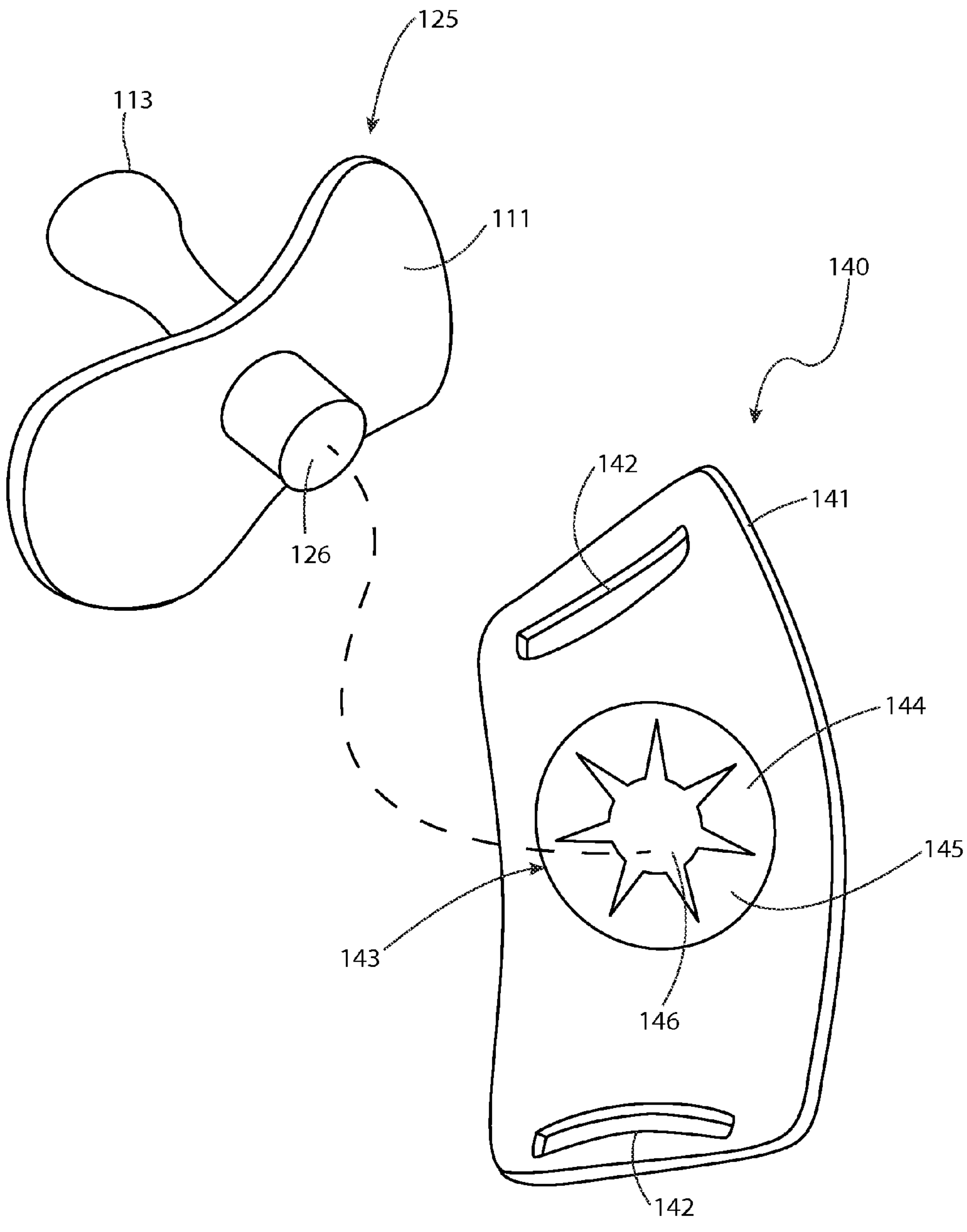
FIG. 7 is a perspective view of the first alternate retaining ring depicted for use with a third pacifier.
Figure 8:
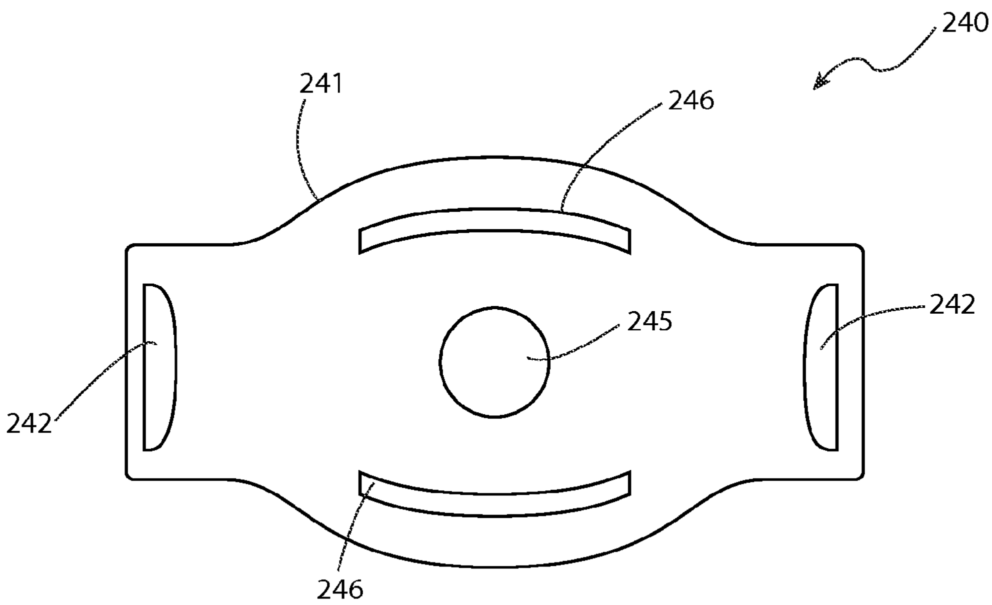
FIG. 8 is a front view of a second alternate retaining ring.
Figure 9:
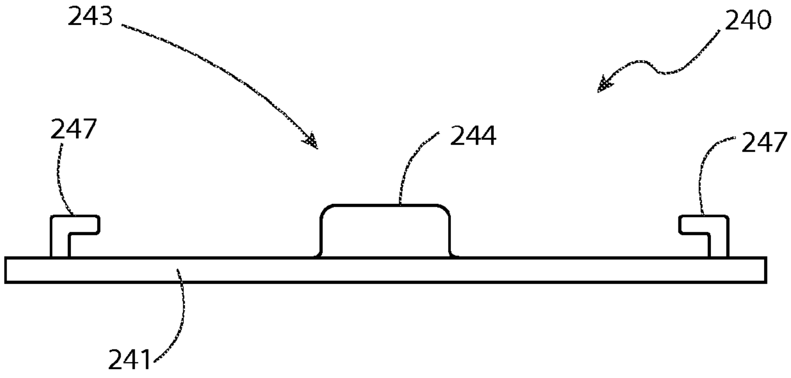
FIG. 9 is a top view of the second alternate retaining ring.
Figure 10:
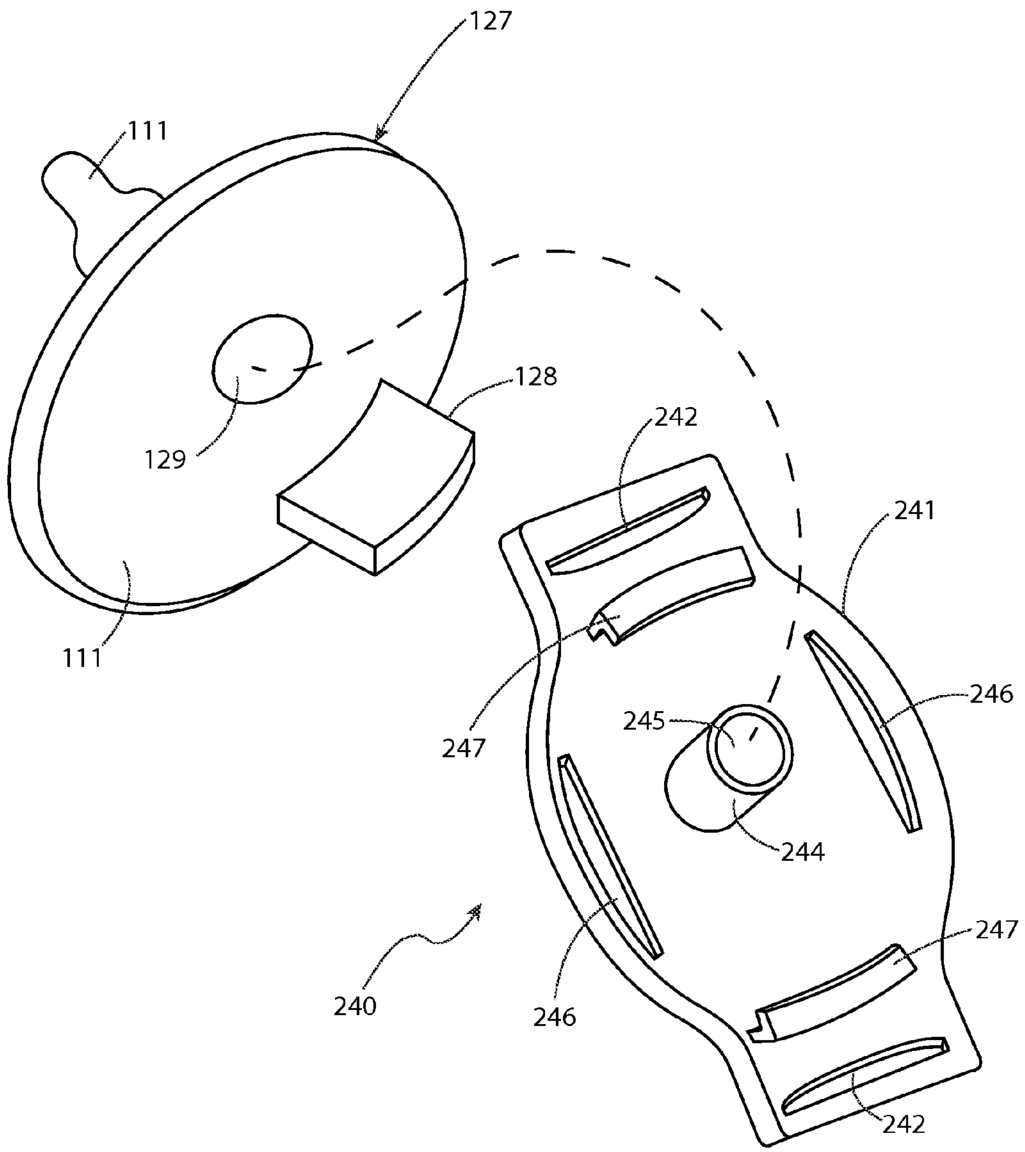
FIG. 10 is a perspective view of the second alternate retaining ring depicted for use with a fourth pacifier.

Referring now to FIGS. 6 though 10 depicting alternate embodiments of the retaining rings. FIGS. 6 and 7 show a first alternate retaining ring 140 for use with a third pacifier 125. The third pacifier 125 includes those types of pacifiers having a mouth guard 111, a nipple 113 extending from an inner surface of the mouth guard 111, and a third pacifier handle 126. The third pacifier handle 126 is illustrated as a generally cylindrical knob extending from the outer surface of the mouth guard 111. FIGS. 8 through 10 show a second alternate retaining ring 240 for use with a fourth pacifier 127. The fourth pacifier 127 includes those types of pacifiers having a mouth guard 111, a nipple 113 extending from an inner surface of the mouth guard 111, and a fourth pacifier handle 128. The nipple 113 of the fourth pacifier 127 is generally hollow and a nipple aperture 129 is disposed within the center of the mouth guard 111 for providing an opening to the hollow nipple 113. The fourth pacifier handle 128 is illustrated as a generally curved, thin rib extending outwardly from the outer surface of the mouth guard 111.

As best seen in FIGS. 6 and 7, the first alternate retaining ring 140 has a generally thin, plastic retaining ring body 141. The retaining ring body 141 preferably has a slightly curved profile to match the curvature of the mouth guard 111 of the third pacifier 125. A first alternate retaining feature 143 is disposed at a generally central location of the retaining ring body 141 for captively engaging the third pacifier handle 126 when inserted within. The first alternate retaining feature 143 is preferably a semi-rigid perimeter member 144 having a plurality of flexible flaps 145 that define a retaining aperture 146. The third pacifier handle 126 is inserted through the retaining aperture 146 where the flexible flaps 145 grip around its circumference to retain the third pacifier 125 within the first alternate retaining ring 140. A pair of first alternate retaining ring slots 142 are disposed at opposing sides of the retaining ring body 141. Each retaining ring slot 142 is adapted for threadably receiving one of the pacifier retaining straps 30. The straps 30 are passed through the retaining ring slots 142 and the male fastener 35 of each strap 30 is attached to a selected one (1) of the corresponding female fasteners 34 to form a loop 31.

As best seen in FIGS. 8 through 10, the second alternate retaining ring 240 also has a generally thin, plastic second alternate retaining ring body 241, having a front surface and a rear surface. The retaining ring body 241 can have a flat profile or a slightly curved profile to match the curvature of the mouth guard 111 of the fourth pacifier 127. A pair of second alternate retaining features 243 is disposed at opposing sides of the inner surface of the retaining ring body 241 for captively engaging the mouth guard 111 of the fourth pacifier 127 when inserted within. The second alternate retaining features 243 include a pair of semi-flexible, inwardly facing L-shaped protrusions 247 extending outwardly away from the retaining ring body 241. As such, a gap is formed between the protrusions 247 and the front surface of the retaining ring body 241. The second alternate retaining features 243 also includes a hollow nipple grip 244 is disposed at a generally central location of the retaining ring body 241 and extends outwardly around a nipple grip aperture 245 for insertingly engaging the hollow nipple 113 of the fourth pacifier 127 when inserted within. The nipple grip aperture 245 provides access to the hollow interior of the nipple 113 of the fourth pacifier 127. A pair of handle slots 246 is disposed along a top and bottom end of the retaining ring body 241 for receiving the fourth pacifier handle 128. The fourth pacifier handle 128 can be captively inserted within either one of the pair of handle slots 246, in such a manner the fourth pacifier handle 128 can be used right-side up or upside down with the second alternate retaining ring 240. The fourth pacifier handle 128 is inserted through one of the handle slots 246 where the flexible protrusions 247 grip around the edge of the mouth guard 111. The nipple grip 244 inserts within the nipple aperture 129 for gripping the inside of the hollow nipple 113. A pair of second alternate retaining ring slots 242 is disposed at opposing sides of the retaining ring body 241, adjacent to an outermost edge thereof. In a preferred embodiment, the flexible protrusions 247 are spaced inwardly from the retaining ring slots 242. Each retaining ring slot 242 is adapted for threadably receiving one of the pacifier retaining straps 30. The straps 30 are passed through the retaining ring slots 242 and the male fastener 35 of each strap 30 is attached to a selected one (1) of the corresponding female fasteners 34 to form a loop 31.

It can be appreciated by one skilled in the art that other styles and configurations of the invention can be easily incorporated into the teachings of the present disclosure and only certain particular configurations have been shown and described for purposes of clarity and disclosure and not by way of limitation of scope.

In accordance with the invention, the preferred embodiment can be utilized by the user in a simple and effortless manner with little or no training. After initial purchase or acquisition of the device 10, it is installed and utilized as indicated in FIGS. 1 through 10.

The method of installing and utilizing the apparatus 10 can be achieved by performing a series of steps. It can be appreciated that the steps described can be performed in alternative order and as such should not be viewed as a limiting factor. Obtaining the device 10. Determining a proper tension for the straps 30 by placing the hat 20 on an infant's head 101, passing each strap 30 through a corresponding pacifier slit 112, placing the pacifier 110 in the infant's mouth 102, and attaching each male fastener 35 to a selected corresponding female fastener 34 in order to form a loop 31. Securing the pacifier 110 within the loops 31 and providing a desired amount of tension against the pacifier 110. Detaching the male fastener 35 and reattaching the male fastener 35 to a different female fastener 34 to adjust the amount of tension against the pacifier 110. Preventing the pacifier 110 from accidentally falling away from the infant 100 and the infant's mouth 102 during use. Removing the hat 20 and pacifier 110 after use.

After a first use, the device 10 can be used in a quicker manner by leaving the pacifier 110 attached to the straps 30 during periods of non-use and replacing the pacifier 110 in the infant's mouth as needed. By replacing the hat 20 on the infant's head 101 the caretaker can instantly and accurately achieve the same predetermined desired amount of tension as determined above.

The method of utilizing the device 10 with the various other styles of pacifiers 120, 125, 127, having no pacifier slits 112, can be achieved by performing a series of steps. It can be appreciated that the steps described can be performed in alternative order and as such should not be viewed as a limiting factor. Obtaining the device 10. Placing the hat 20 on an infant's head 101. Placing the pacifier 120, 125, 127 in the infant's mouth 102. Passing the retaining ring 40, 140, 240 over the pacifier handle 124, 126, 246 and placing against the rear surface of the mouth guard 111 of the pacifier 120, 125, 127. Passing each strap 30 through the retaining ring aperture 41, 142, 242 and attaching each male fastener 35 to a selected corresponding female fastener 34 in order to form a loop 31. Securing the retaining ring 40, 140, 240 and provide a desired amount of tension against the retaining ring 40 and the pacifier 120, 125, 127. Detaching the male fastener 35 and reattaching to a different female fastener 34 to adjust the amount of tension against the retaining ring 40, 140, 240 and the pacifier 120, 125, 127. Preventing the pacifier 120, 125, 127 from accidentally falling away from the infant 100 and the infant's mouth 102 during use. Removing the hat 20 and pacifier 120, 125, 127 after use.

After a first use of the device 10 with the retaining ring 40, 140, 240, the device 10 can be used in a quicker manner by leaving the retaining ring 40, 140, 240 attached to the straps 30 during periods of non-use and replacing the pacifier 120, 125, 127 in the infant's mouth. The retaining ring 40, 140, 240 is placed over the pacifier 120, 125, 127 and the hat 20 is placed on the infant's head 101 to instantly and accurately achieve the same predetermined desired amount of tension as determined above.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. An infant hat comprising:

a hat body comprising a flexible head receiving member adapted to receive an infant's head having a perimeter opening suitably sized to approximate said infant's head;

a pair of straps affixed to opposing locations upon said hat perimeter opening, each of said straps comprising a length adjustable fastener for forming a loop in a free end; and, a retaining ring adapted to retain a pacifier, said retaining ring comprising:

a retaining ring body comprising a front surface, a rear surface, and a body shape, wherein said body shape is adapted to match a shape of a pacifier mouth guard of said pacifier;

an opposed pair of flexible L-shaped protrusions extending perpendicularly away from said front surface of said retaining ring body and facing each other, such that a gap is formed between said L-shaped protrusions and said front surface, wherein said pair of L-shaped protrusions is adapted to captively engage an outer peripheral edge of said pacifier mouth guard; and, a pair of retaining ring slots disposed along opposing sides adjacent to an outermost edge of said retaining ring body for receiving said pair of straps;

wherein said L-shaped protrusions are spaced inwardly from said retaining ring slots; and, wherein said straps are removably connected through said retaining ring slots to maintain said pacifier in a position adjacent to a mouth of an infant.

2. The device of claim 1, wherein said fastener further comprises a male snap fastener disposed on an end of said strap and a plurality of mating female snap fasteners disposed along said strap adjacent to said hat for selectively receiving said male snap fastener;

wherein said loop is formed when said male snap fastener is engaged to a selected one of said plurality of female snap fasteners; and, wherein engaging said male snap fastener to a different one of said plurality of female snap fasteners longitudinally adjusts a length of said strap.

3. The device of claim 1, wherein said pair of straps is formed from a durable non-elastic fabric material.

4. The device of claim 2, wherein said male snap fastener and said plurality of female snap fasteners are disposed on the same surface of said strap; and, said plurality of female snap fasteners are spaced apart at equal distances.

5. The device of claim 1, wherein said retaining ring further comprises a nipple grip extending outwardly from generally central location of said retaining ring body, wherein said nipple grip is adapted to be inserted into a hollow nipple body of said pacifier.

6. The device of claim 5, wherein said retaining ring further comprises a nipple grip aperture disposed through said nipple grip, wherein said nipple grip aperture is adapted to align with a nipple aperture of said hollow nipple body.

7. The device of claim 5, wherein said retaining ring further comprises at least one handle slot disposed through said retaining ring body, wherein said handle slot is adapted to receive a pacifier handle of said pacifier.

8. The device of claim 1, wherein said retaining ring further comprises at least one handle slot disposed through said retaining ring body, wherein said handle slot is adapted to receive a pacifier handle of said pacifier.

9. The device of claim 8, wherein said at least one handle slot is disposed along one of a top end or a bottom end of said retaining ring body.

10. The device of claim 1, wherein said retaining ring further comprises a pair of handle slots disposed along a top and a bottom end of said retaining ring body, wherein said handle slots are adapted to receive a pacifier handle of said pacifier.

11. The device of claim 1, further comprising said pacifier, said pacifier comprising:

said pacifier mouth guard;

a hollow nipple extending from said pacifier mouth guard; and a pacifier handle extending from said pacifier mouth guard opposite said nipple.

12. The device of claim 11, wherein said retaining ring further comprises:

a nipple grip extending outwardly from generally central location of said retaining ring body to be inserted into said hollow nipple; and, at least one handle slot disposed through said retaining ring body to receive said pacifier handle.

13. The device of claim 12, wherein said retaining ring further comprises a nipple grip aperture disposed through said nipple grip to align with a nipple aperture of said hollow nipple.

* * * * *